United States Patent [19]

Miles

[11] 4,058,930
[45] Nov. 22, 1977

[54] TURF GROWING APPARATUS

[76] Inventor: Oscar L. Miles, 7845 Sunset Lane, Indianapolis, Ind. 46260

[21] Appl. No.: 645,341

[22] Filed: Dec. 30, 1975

[51] Int. Cl.² .............................................. A01G 9/02
[52] U.S. Cl. ........................................ 47/58; 47/66; 47/73
[58] Field of Search .................. 47/14, 15, 16, 33, 34, 47/37, 1, 33, 66, 73, 74, 77, 84, 85, 86, 58

[56] References Cited

U.S. PATENT DOCUMENTS

| | | | |
|---|---|---|---|
| 1,031,713 | 7/1912 | Hills | 47/37 |
| 2,039,442 | 5/1936 | Mulford | 47/37X |
| 2,121,461 | 6/1938 | Widmann | 47/16 X |
| 2,134,647 | 10/1938 | Savage | 47/34 R |
| 2,279,735 | 4/1942 | Gates | 47/33 |
| 2,793,470 | 5/1957 | Hallum | 47/37 |
| 3,162,981 | 12/1964 | Miller | 47/37 |
| 3,947,995 | 4/1976 | Renfro | 47/34 R |

FOREIGN PATENT DOCUMENTS 928,803  6/1955  Germany .............................. 47/34.7

*Primary Examiner*—Edward M. Coven
*Assistant Examiner*—James R. Feyrer
*Attorney, Agent, or Firm*—Woodard, Weikart, Emhardt & Naughton

[57] ABSTRACT

A turf growing apparatus which comprises a container having a bottom and an upwardly extending side wall, and a collar releasably attached to the exterior of the upright side wall and extending above the top of the side wall. Grass is grown in a grass-growing medium which extends above the top of the side wall and fills the area enclosed by the collar. The collar is removed upon installation of the apparatus and the grass thereby is supported by and is contiguous with the surface in which the apparatus is placed.

7 Claims, 4 Drawing Figures

TURF GROWING APPARATUS

BACKGROUND OF THE INVENTION

1. Field of the Invention

This invention relates to growing grass in a unit which may be installed adjacent to other grass.

2. Description of the Prior Art

Raising grass is known to be a lengthy and tedious task. The location must be properly prepared and the seed must be spread. The early stages of growth require sufficient water and sunlight, and must not be exposed to severe weather conditions. In addition, the area must be protected from excessive use. This restriction results in the wasteful idleness of the seeded area, and is particularly inconvenient if the location is one which has been reseeded because of its frequent use.

Sodding is a well known alternative to the lengthy process of raising grass from seed. Several problems, however, do arise in conjunction with sodding. The primary disadvantage of sodding is that the turf is physically cut and extracted from its original site. This process is lengthy and expensive and damages the root structure of the grass. Further, the turf is often rolled up for transportation, and this results in additional damage to the grass. As a result, the installed sod must be carefully cared for to insure survival of the grass.

Devices are known for the transplanting of certain plants. The existing devices, however, are not suited to use with grass, which requires that the top of the soil in which it is grown be level with the surface in which the grass is placed. In one type of transplanting device, the growing plant is removed from the container with the soil. This unnecessarily disturbs the growth of the plant, and requires time and physical manipulation which would become especially onerous if a large area was to be covered. After the plant growth is installed for the first time, this procedure also does not facilitate repeated installations in the same location. If grass was installed in this manner and the area again became worn as by excessive use, then the formerly installed grass and soil would have to be severed from the ground in which it was placed.

A second method for transplanting utilizes a container which is installed in the ground along with the growing plants. This method is similarly not suited for installation of growing grass. For a grassed area, it is important that the growing surface be level and continuous and that the grass grow uninterruptly throughout the area. With existing devices, if the container is installed with the grass, then there will be a seam having the width and shape of the top edge of the container within which the grass will not grow. The top edge of the container will also be at the surface of the ground, where it could be felt if walked upon or if otherwise contacted. This could be dangerous if the surface was to be used for sports activities or if a person should fall on this seam.

For flowers, it is common to submerge the container below the surface in which it is installed. Then dirt is filled in over the soil in the container and over the container walls. This is permissible for flowers since the seams are not noticeable and the stems of the flowers can be submerged to a certain extent. For grass, however, this procedure would not be appropriate since the seam would still exist. Also, the dirt could not be filled in over the soil in the container since that would cover the grass growing there.

SUMMARY OF THE INVENTION

A turf growing apparatus is described comprising a container having a bottom and an upwardly extending side wall, and a collar releasably attached to the exterior of the upright side wall and extending above the top of the side wall. The unit is filled with a composition suitable for growing grass, with the surface of this composition being above the top of the sides of the container. The unit is installed adjacent to existing turf or to a unit of similar design. Upon installation, the collar is removed and the side of the growing medium extending above the top of the sides of the container will uniformly adjoin the surface in which the unit is installed with no seam evident.

It is a first object of my invention to provide an apparatus for easily and quickly installing a grass section, without the seam along the perimeter of the grass section being evident.

It is a further object of my invention to provide an apparatus which facilitates the installation of growing grass and which does not result in damage to the transplanted grass.

It is a further object of my invention to provide an apparatus which may be used in conjunction with a plurality of like devices for uniformly covering a surface with turf, and which additionally fulfills the above objectives.

Another object of my invention is to provide an apparatus which facilitates installation of turf and which may be easily and quickly replaced by a similar unit.

Further objects and advantages of the present invention shall be apparent from the following detailed description and accompanying figures.

DESCRIPTION OF THE PREFERRED EMBODIMENT

Figure 1:
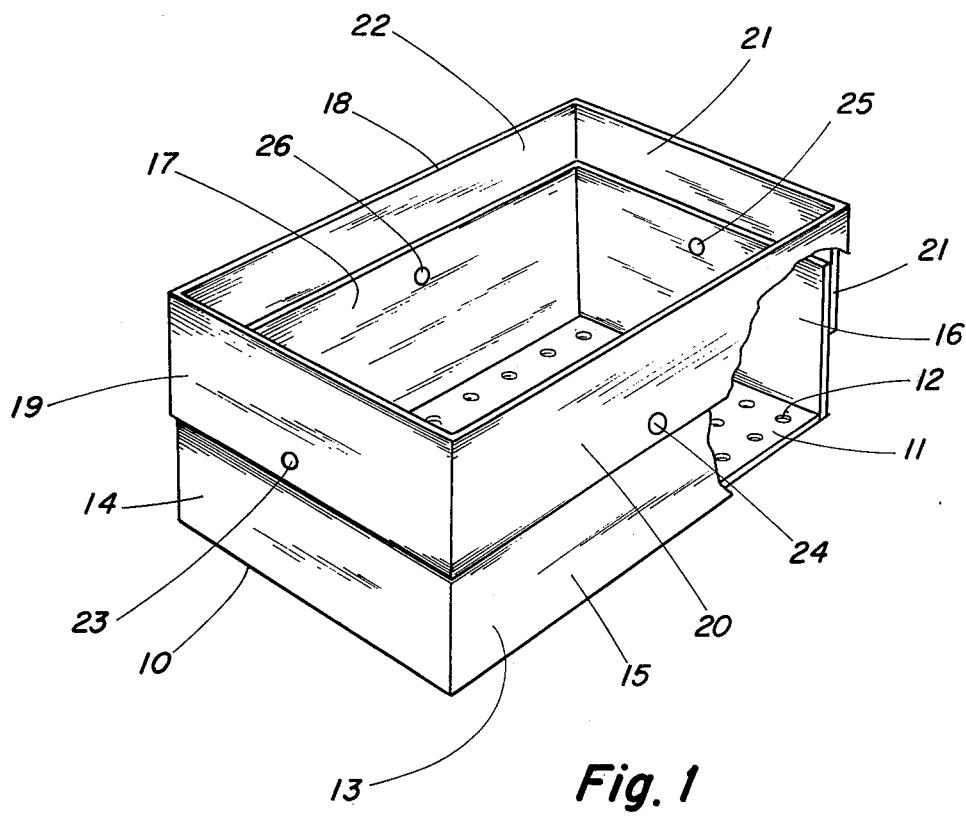
FIG. 1 is an isometric view of a container which could be used in practicing my invention, with a portion cut away to facilitate description.

For the purposes of promoting an understanding of the principles of this invention, reference will now be made to the embodiment illustrated in the drawings, and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring in particular to FIG. 1, there is shown one embodiment of a container which could be used in practicing the present invention. The container 10 includes a bottom 11 having several perforations such as 12 through which water may pass. Side wall 13 is attached to the bottom 11 and comprises four straight upright side wall members 14 through 17.

Collar 18 is attached to the exterior of the side wall 13. Collar 18 includes four straight, upright members 19 through 22, which are held to the exterior of side wall members 14-17 by plugs 23 through 26, respectively. Collar 18 extends above the top of the side wall 13 of container 10.

Figure 2:
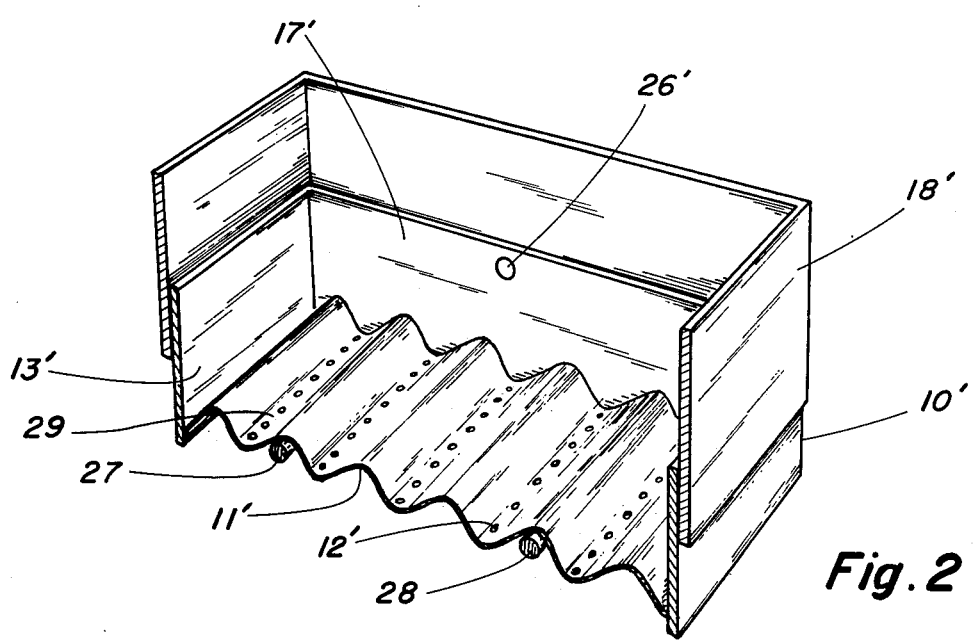
FIG. 2 is a perspective, cross-sectional view of an alternate embodiment of a container which could be used in practicing my invention.

In FIG. 2 there is shown an alternate embodiment of a container which could be used in the present invention. Container 10' includes a side wall 13' and reinforcing rods 27 and 28, which extend essentially perpendicularly from side wall member 17' to the opposite side wall member, now shown. Bottom 11' comprises a corrugated member which rests upon rods 27 and 28, and which has drain holes such as 12' located along the valleys of the corrugated member 29.

Collar 18' is releasably attached to the exterior of side wall 13' by plugs such as 26'.

Figure 3:
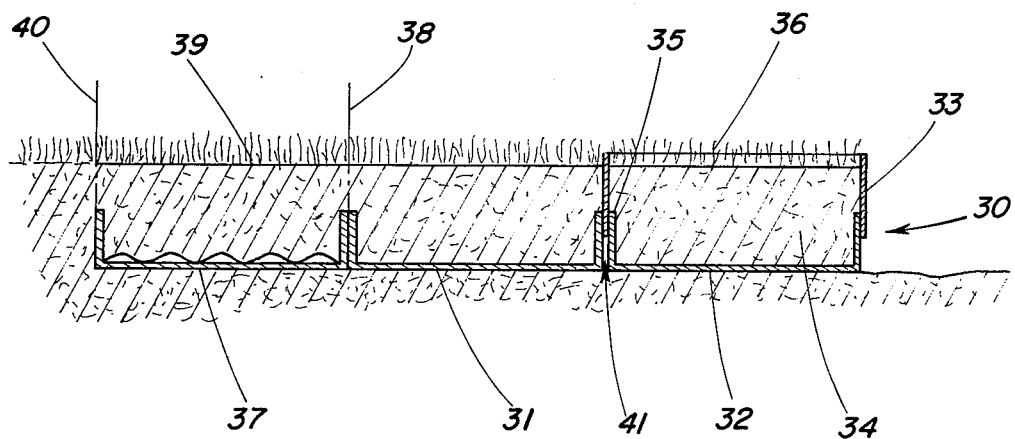
FIG. 3 is a cross-sectional view of one embodiment of my invention shown adjacent to two units which have been installed by removal of the collars therefrom.

One embodiment of the present invention is shown in cross-sectional view in FIG. 3. Turf growing apparatus 30 is shown adjacent a second apparatus 31, from which the collar has been removed.

Apparatus 30 comprises a container 32, to which collar 33 is releasably attached. Grass growing medium 34 fills the container 32 and extends above the top 35 of container 32, and fills the area around which collar 33 extends. Live grass 36 is growing in the medium 34.

The present invention may be used for installing grass adjacent other grass which is growing either in the earth or in a similar container. In FIG. 3, container 31 is shown adjacent container 37 along line 38. With the collars removed from containers 31 and 37, the grass and growing medium of each container firmly abut along line 38. The growing surface 39 is uninterrupted between the adjacent containers.

Container 37 is shown in FIG. 3 adjacent the earth and grass growing therein, along line 40. As noted before, the apparatus of the present invention permits installation of the apparatus which, when followed by removal of the collar, results in an uninterrupted grass surface between the container of the present invention and the surface to which the container is adjacent. The grass surface 39 across line 40 is made uniform by proper positioning of container 37 prior to removal of the collar.

Before removal of the collar 33 from the container 32, there is a gap 41 between the exterior of the container 32 and the exterior of the neighboring container 31. A gap would also exist between the container and the adjacent earth if the unit were installed in the ground. This gap is made as narrow as possible by making the collar thin. When the units are installed adjacent one another, the containers may be pushed together after the collars are removed.

Figure 4:
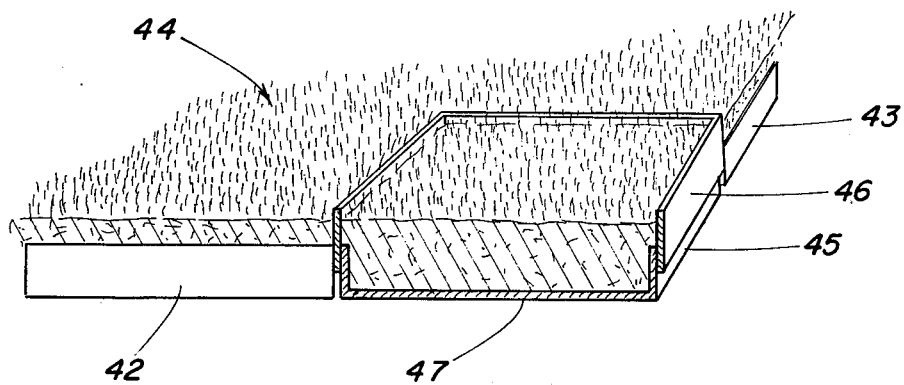
FIG. 4 is a perspective cross-sectional view of an embodiment of my invention.

In FIG. 4 there is shown another embodiment of the present invention. Containers such as 42 and 43 have been arranged to form a continuous grass surface 44. Placement of the containers is accomplished by positioning the apparatus of the present invention adjacent one another and thereafter removing the respective collars. Turf growing apparatus 45 is shown with collar 46 abutting containers 42 and 43. Apparatus 45 is thereby positioned such that removal of the collar 46 will result in an uninterrupted grass surface across the boundaries between containers 42 and 43 and container 47.

The apparatus in FIGS. 3 and 4 have been pictured in the preferred embodiment as having a side wall which forms a rectangle. It is clear, however, that the apparatus may be of any shape which would permit several of the containers to be placed adjacent one another to form a uniform, continuous surface. Other side wall configurations would also satisfy this requirement. The containers could, for example, be triangular in shape. In addition, the configuration of the containers could vary in such a way that the combination of the proper assortment of apparatus would form a continuous surface, much as a jigsaw puzzle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for providing an uninterrupted turf surface composed of a plurality of independent sections of turf which comprises the steps of:
    a. growing the turf in containers, each container having a bottom wall and side walls extending upwardly therefrom, at least a portion of each container being water permeable;
    b. providing each container with a collar having a portion overlapping and removably attached to the exterior of the side walls of the container and a portion extending above the top of the side walls, and grass-growing medium filling each container and extending above the top of the side walls and substantially to the top of the collar;
    c. positioning a container and attached collar in the ground adjacent growing turf, the grass-growing medium within the container being level with the top of the medium in which the adjacent turf is growing;
    d. removing the collar from the container to provide an uninterrupted grass surface between the turf in the container and the adjacent turf; and
    e. repeating steps c and d.

2. The method of claim 1 in which the adjacent turf is growing in an adjacent container having a bottom wall and side walls extending upwardly therefrom, at least a portion of the adjacent container being water permeable, the adjacent container further having a collar having a portion overlapping and removably attached to the exterior of the side walls of said adjacent container, the collar extending above the top of the side walls and grassgrowing medium filling said adjacent container and extending above the top of the side walls, and in which step d. further includes removing the collar from said adjacent container.

3. The method of claim 1 in which the top of each of the collars is rectangular.

4. The method of claim 1 in which each container has a bottom wall which is removably attached to the side walls.

5. The method of claim 1 in which the bottom wall of each of the containers is corrugated.

6. The method of claim 1 in which step b. comprises providing each container with a collar which extends above the top of the side walls of the respective container by about two inches.

7. The method of claim 1 in which each container includes four straight side walls attached to each other at about right angles, the bottom wall of each container being removably attached to the side walls of the respective container, the bottom wall of each container including a corrugated surface and having a portion which is water permeable, and further in which step b. comprises providing each container with a collar which extends above the top of the side walls by at least about 2 inches.

* * * * *